US008648732B2

(12) United States Patent
Lu et al.

(10) Patent No.: US 8,648,732 B2
(45) Date of Patent: Feb. 11, 2014

(54) PRESSURE SENSING BASED LOCALIZATION AND TRACKING SYSTEM

(75) Inventors: Ching-Hu Lu, Taipei (TW); Li-Chen Fu, Taipei (TW)

(73) Assignee: National Taiwan University, Taipei (TW)

( * ) Notice: Subject to any disclaimer, the term of this patent is extended or adjusted under 35 U.S.C. 154(b) by 1064 days.

(21) Appl. No.: 12/619,594

(22) Filed: Nov. 16, 2009

(65) Prior Publication Data

US 2010/0164737 A1 Jul. 1, 2010

(30) Foreign Application Priority Data

Dec. 31, 2008 (TW) ............................... 97151850 A

(51) Int. Cl.

| | |
|---|---|
| ***G08B 21/00*** | (2006.01) |
| ***G08B 23/00*** | (2006.01) |
| ***G08B 13/14*** | (2006.01) |
| ***G08B 1/08*** | (2006.01) |
| ***G06F 17/10*** | (2006.01) |
| ***H04H 60/32*** | (2008.01) |
| ***H04H 60/56*** | (2008.01) |

(52) U.S. Cl.
USPC ..................... 340/665; 340/686.1; 340/573.3; 340/572.7; 340/539.1; 340/572.8; 701/124; 725/19; 725/12

(58) Field of Classification Search
USPC ........... 340/665, 686.1, 666, 573.1, 436, 438, 340/540, 539.16, 539.26, 539.22, 584; 705/7.11, 7.14, 7.42; 235/375, 376, 235/385; 714/729, 727, 716
See application file for complete search history.

(56) References Cited

U.S. PATENT DOCUMENTS

| | | | | |
|---|---|---|---|---|
| 6,032,536 | A * | 3/2000 | Peeters et al. | 73/725 |
| 6,233,776 | B1 * | 5/2001 | Blum et al. | 15/215 |
| 6,707,386 | B1 * | 3/2004 | Pruisner | 340/665 |
| 7,434,459 | B2 | 10/2008 | Schmidt et al. | |
| 2003/0033600 | A1 * | 2/2003 | Cliff et al. | 725/12 |
| 2004/0148089 | A1 * | 7/2004 | Schmidt et al. | 701/124 |
| 2006/0202832 | A1 * | 9/2006 | Reznik et al. | 340/572.7 |
| 2007/0050271 | A1 * | 3/2007 | Ufford et al. | 705/28 |
| 2009/0195393 | A1 * | 8/2009 | Tegeler | 340/573.3 |

OTHER PUBLICATIONS

Helal et al. "The Gator Tech Smart House: A Programmable Pervasive Space," IEEE Computer Society, Mar. 2005, pp. 50-60.

(Continued)

*Primary Examiner* — Jennifer Mehmood
*Assistant Examiner* — Mirza Alam

(57) ABSTRACT

A locating and tracking system is provided. The locating and tracking system includes plural pressure sensing modules, each of which includes at least one pressure sensing unit detecting a pressure source and generating a signal; a data processing unit connected with the at least one pressure sensing unit, and processing the signal to generate a module information; a storage unit connected with the data processing unit, and storing the module information and an user information; a communication unit connected with the data processing unit, transmitting the module information, and receiving an outer information; and a power managing unit managing a power needed by the at least one pressure sensing unit, the data processing unit, the storage unit and the communication unit; a bottom board configured on a floor, and bearing the mentioned units; and a top board covering the mentioned units, and transferring the pressure source to the pressure sensing unit.

21 Claims, 4 Drawing Sheets

(56) References Cited

OTHER PUBLICATIONS

Lin et al. "Multi-user Preference Model and Service Provision in a Smart Home Environment," Proceedings of the 3rd Annual IEEE Conference on Automation Science and Engineering, Scottsdale, AZ, USA, Sep. 22-25, 2007, pp. 759-764.

Rangarajan et al. "The Design of a Pressure Sensing Floor for Movement-based Human Computer Interaction,"EuroSSC'07, Proceedings of the 2nd European Conference on Smart Sensing and Context, 2007, 18 pages.

* cited by examiner

PRESSURE SENSING BASED LOCALIZATION AND TRACKING SYSTEM

FIELD OF THE INVENTION

The present invention relates to a localization and tracking system, and more particular to a pressure sensing based localization and tracking system.

BACKGROUND OF THE INVENTION

In the highly informational era, many electronic devices are connected with the information systems. It is an important issue how to accurately handle the states or the related information of users and well arrange the information and the interactive services required by the users. Among all of the user-related contexts, location is one of the most important information, because many practical applications deeply rely on the locations of users. It is a great challenge how to obtain more precise and reliable location information.

In the conventional user localization and tracking apparatus, the major stream is using cameras and mobile equipments, such as RFIDs, infrared, ultrasonic, cell phone or wireless transmission devices, to obtain the location information of a user. The system can estimate the approximate location of the user in a specific environment through cameras. However, the configuration of cameras needs lots of complicated calibration in advance. If a user does not have the background or training, it is easy to make the cameras fail to do their best, or even causes erroneous estimates or failure. Furthermore, cameras can capture more details of the activities, which leads to privacy violation.

On the other hand, if the localization and tracking function is performed by mobile devices, it does not need much calibration, but it causes inconvenience for the users since they have to carry the devices. If a user forgets to carry the mobile equipment, the tracking function will be completely unavailable. Moreover, if the wireless signal, such as the signal strength or the transmission time, is directly used to locate and track the user, the deployment cost is cheaper than others. However, the signal may be easily affected by the variations of the environment; for example, the moving subjects or the layout may affect the stability and the accuracy of the wireless signal transmission. Furthermore, the battery-powered devices are gradually depleted over time, which in turn deteriorates the stability of the tracking system.

The advantages of using the wireless pressure sensing module to localize and track users can overcome the drawbacks mentioned above, such as the complicated pre-calibration, the privacy violation and inconvenience due to carrying the devices. Nowadays, regarding the current studies of the pressure sensing floor, the prior work uses wired load cells with fixed deployment layouts, whose disadvantage is the cost to re-layout and maintain the system after the floor is settled. We found the wireless pressure sensing pad used to detect the presence of people, but there is no relevant off-the-shelf products we can purchase directly at the moment of proposing the wireless pressure sensing module. To sum up, there is no floor device using wireless sensing networks to provide multi-resolution of tracking granularity so as to provide the natural, precise and convenient location-aware services.

In order to overcome the drawbacks in the related prior works, a pressure sensing based localization and tracking system is provided. The particular design in the present invention not only solves the problems described above, but also is easy to be implemented. Thus, the invention has its industry utility.

SUMMARY OF THE INVENTION

The characteristics of the present invention is to detect the sensing data of the users by using plural locating and tracking devices, which are also called pressure sensing modules; the modules send the sensing data to the remote platform through the communication device, and to estimate the states of the users according to the sensing data. In accordance with the aspect of the present invention, a locating and tracking system is provided. The locating and tracking system includes plural pressure sensing modules, each of which includes at least one pressure sensing unit detecting a pressure source and generating a signal; a data processing unit connected with the at least one pressure sensing unit, and then processing the signal to generate a module information; a storage unit connected with the data processing unit, and storing the module information and user information; a communication unit connected with the data processing unit, transmitting the module information, and receiving an outer information; and a power managing unit managing power needed by the at least one pressure sensing unit, the data processing unit, the storage unit and the communication unit; a bottom board configured on a floor, and bearing the mentioned units; and a top board covering the mentioned units, and transferring the pressure source to the pressure sensing unit.

According to the locating and tracking system described above, the module information includes a sensing data derived from the signal from the at least one pressure sensing unit and an identification (ID) of each of the pressure sensing units.

According to the locating and tracking system described above, the processing unit determines a location of the pressure source by recognizing the sensing data.

According to the locating and tracking system described above, the sensing data includes a weight data of the pressure source, and the user information includes a user weight and a user ID.

According to the locating and tracking system described above, the processing unit recognizes the user ID by comparing the user weight with the weight data.

According to the locating and tracking system described above, further comprising a service providing unit and a remote centralized platform locating and tracking the pressure source according to the module information and driving the service providing unit according to a motion state of the pressure source.

According to the locating and tracking system described above, the service providing unit is one selected from a group consisting of an actuator, a monitor, an illuminating device, and a household appliance.

In accordance with another aspect of the present invention, a method for locating and tracking is provided. The method for locating and tracking includes the steps of sensing a pressure source to generate a signal related to the pressure source; comparing the signal with a module information and a user information to identify an ID and a location of an user; and providing a specific service according to the identification and the location of the user.

According to the method described above, the pressure source is sensed by plural pressure sensing modules having different quantity of pressure sensing units to provide different detecting resolutions, respectively According to the method described above, the specific service is switched by a remote centralized platform.

According to the method described above, the signal includes a weight data of the pressure source, the module information includes an ID of a sensor, and the user information includes a weight data and an ID of the user.

In accordance with a further aspect of the present invention, a pressure sensing module is provided. The pressure sensing module includes at least one pressure sensing unit detecting a pressure source and generating a signal; a data processing unit connected with the at least one pressure sensing unit, and processing the signal to generate a module information; a storage unit connected with the data processing unit, and storing the module information and an user information; and a communication unit connected with the data processing unit, transmitting the module information, and receiving an outer information.

According to the pressure sensing module described above, further comprising a power managing unit managing a power needed by the at least one pressure sensing unit, the data processing unit, the storage unit and the communication unit; a bottom board configured on a floor, and bearing the at least one pressure sensing unit, the data processing unit, the storage unit, the communication unit and the power managing unit; and a top board covering the at least one pressure sensing unit, the data processing unit, the storage unit, the communication unit and the power managing unit, and transferring the pressure source to the pressure sensing unit.

According to the pressure sensing module described above, the power is one selected from a group consisting of a battery, a DC power and an AC power.

According to the pressure sensing module described above, the module information includes a sensing data derived from the signal from the at least one pressure sensing unit and an ID of each of the pressure sensing units.

According to the pressure sensing module described above, the processing unit determines a location of the pressure source by recognizing the sensing data.

According to the pressure sensing module described above, the sensing data includes a weight data of the pressure source, and the user information includes a user weight and a user ID.

According to the pressure sensing module described above, the processing unit recognizes the user ID by comparing the user weight with the weight data.

According to the pressure sensing module described above, the pressure source is one of a human and an object moving on the pressure sensing module.

According to the pressure sensing module described above, the communication unit is one of a wireless communication device and a wire communication device.

The above contents and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purposes of illustration and description only; it is not intended to be exhaustive or to be limited to the precise fog in disclosed.

Figure 1:
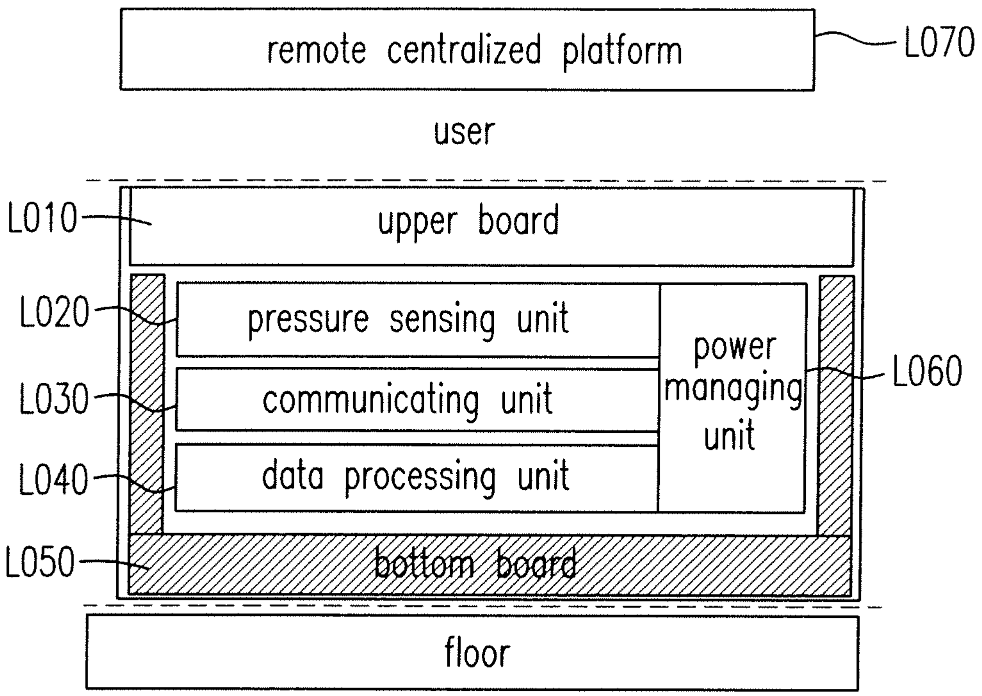
FIG. 1 shows the structure of the pressure sensing module in the pressure sensing based locating and tracking system of the present invention.

Please refer to FIG. 1, which shows the structure of the pressure sensing module in the pressure sensing based localization and tracking system of the present invention. The pressure sensing module includes several function units, and each unit has its own function as follows. An upper board L010 is designed to protect the equipment of the present invention and able to directly receive the force applied from the user, which could be the human or the other movable objects, and transfer the pressure to the pressure sensing unit below. Besides, the upper board L010 can embellish the look of the system. A pressure sensing unit L020 is designed to calculate the pressure transferred from the upper board L010 into a datum, which is transferred to a data processing unit L040 to be processed. The size, the density and the arranging method of the pressure sensing module could be elastically arranged according to the practical need and the cost consideration. Generally, the relationship between the sensing range and the arranging area is the direct proportion, and the higher density of the pressure sensing module is arranged, the shorter reacting time for locating the user is used. It is suggested to have the response characteristics that the pressure sensing unit L020 should be switched off when there is no pressure received, and the impedance thereof should be decreased for the increase of the pressure. Every pressure sensing units L020 should be parallel connected with each other and connected with the data processing unit L040 to receive and process the reacting data. A communicating unit L030 is designed to establish the network connection with the remote centralizing platform L070 (the 802.15.4 communication protocol is used in the following embodiments). The communicating unit L030 transmits the packets according to the event driving method of the data processing unit L040 for decreasing the power consumption and the bandwidth occupation and increasing the scalability of the total arrangement. The data processing unit L040 is designed to process the data needed by the pressure sensing unit L020 and the communicating unit L030, and the process flow thereof is illustrated coordinated with FIG. 2. A bottom board L050 is designed to coordinate with the upper board L010 and to bear the pressure sensing units L020, the communicating unit L030 and the data processing unit L040 therebetween. The upper board L010 and the bottom board L050 can be different materials according to the practices. A power managing unit L060 is designed to manage the power supply of every units in the module, wherein the power could be the battery, the AC or the DC. For saving the cost, plural pressure sensing units L020 can share a communicating unit L030 and a data processing unit L040. It means that some pressure sensing module has only the upper board L010, the pressure sensing units L020 and the bottom board L050, which are grouped to be named as the sensing board, and is connected to the data processing unit L040 in the other module. Moreover, for further saving the cost, some modules could be the space remaining board, which means that there is no pressure sensing unit L020, communicating unit L030 and data processing unit L040 therein, but the space thereof could be remained for expanding or replacing in the future. This design could make the look of the space remaining board be the same as the other module. The remote centralized platform L070 is mainly designed to collect and integrate the information from all of the arranged pressure sensing modules and perform the locating and tracking algorithm to determine the location or the history path of the user for forming a complete localizing and tracking system. There are plural pressure sensing modules set on the floor, each has different number of pressure sensing units L020 connected with the communicating unit L030 and the data processing unit L040 to establish the network connection through the communicating elements, and the remote centralized platform L070 collects and integrates the information from all of the pressure sensing modules and drives other service providing units, i.e. the smart appliances, or broadcasts the necessary control message to specific pressure sensing modules through the platform.

Figure 2:
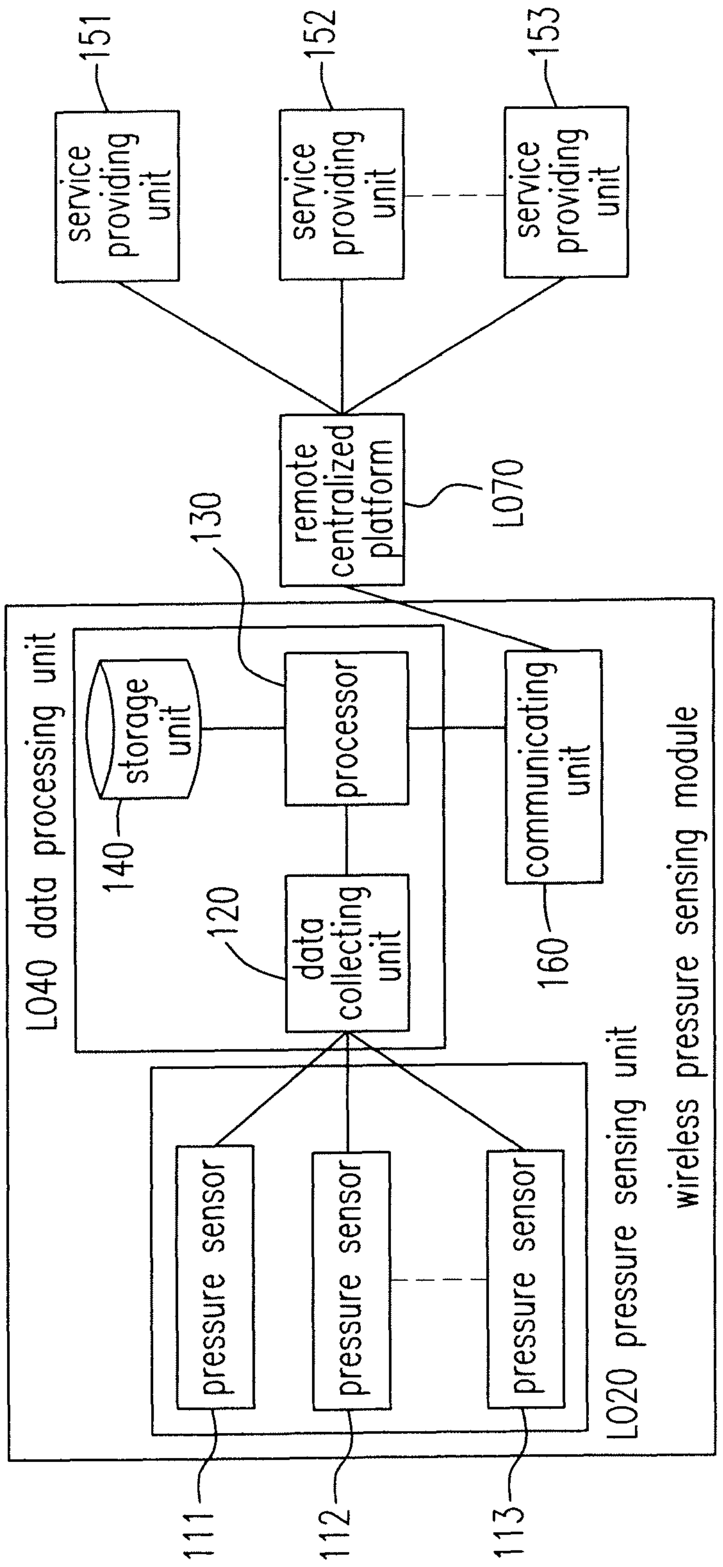
FIG. 2 shows the preferred embodiment of the present invention, the pressure sensing based locating and tracking system.

Please refer to FIG. 2, which is the preferred embodiment of the present invention, the pressure sensing based localization and tracking system. The inside of the pressure sensing module includes pressure sensing units 111,112,113; a data processing unit L040 comprising a data collecting unit 120, a processor 130 and a storage unit 140; and a communicating unit 160. The data process flow of each unit is described as follows. The pressure sensing unit 111,112,113 detects the level or the strength of the pressure performed thereon and generates the sensing data. The data collecting unit 120 is coupled with all of the pressure sensing units 111,112,113, receives the sensing data, and then samples the variation of the current and the voltage of the sensing data and converts the sensing data into the digitalized value (here, it is through the ADC channel). The converted sensing data is transmitted to the processor 130 for comparing and processing, wherein the processor 130 also provides the error correcting and the noise filtering processes. According to the current microcontroller, the data collecting unit 120, the processor 130 and the storage unit 140 could be integrated into a single chip. The processed sensing data are stored in the storage unit 140, and the processor 130 could initiately calculate the current state of the user according to the received sensing data and the history sensing data in the storage unit 140. The state of the user includes the location and the moving speed of the user. When the state of the user is calculated, the processor 130 stores the state data into the storage unit 140 for next state calculation. Accordingly, the processor 130 can determine if the data should be transmitted to the remote centralized platform L070 for event driving according to the state of the user, such as if the user stands on a specific module. Then, the remote centralized platform L070 performs the locating and tracking algorithm to estimate the possible location or establish the historical moving path of the user in the environment, for example locating the user directly corresponding to the pressure sensing data and tracking the user by the historical locations; or using the pressure sensing data from every modules as the input of the conventional locating and tracking algorithm. The remote centralized platform L070 determines whether or what service providing units 151, 152, 153 need to be turned on according to the estimation result, wherein the service providing units 151, 152, 153 include the actuator, the monitor, and the multimedia, the audio and the lighting equipments.

In some embodiment, the difference of the user weight could be distinguished by the pressure sensing module. The different weight data corresponding to the different users could be stored in the storage unit 140 in advance, so the processor 130 can calculates the user weight according to the received sensing data and recognizes the identification of the user by comparing the stored data and the received data. This process could also be performed on the remote centralized platform L070, which can precisely track the locations of the plural users in this condition and turn on the specific service providing units 151, 152, 153 according to the IDs, the favorite records and the corresponding location of the users.

Figure 3:
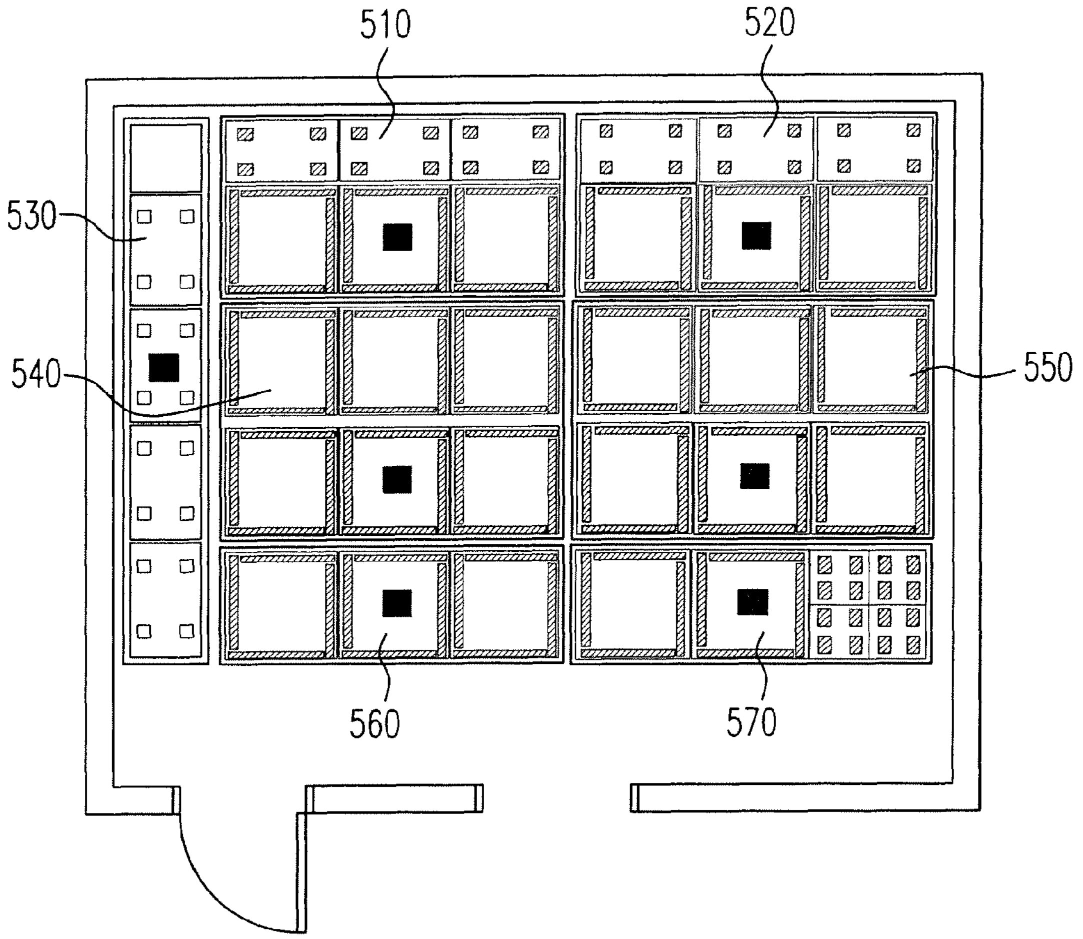
FIG. 3 shows the multi-solutions configuration of the preferred embodiment of the present invention, the pressure sensing based locating and tracking system.

Please refer to FIG. 3, which is the multi-resolutions configuration of the preferred embodiment of the present invention, the pressure sensing based localization and tracking system. In this embodiment, there are thirty-five pressure sensing modules with different size, which are sorted into seven blocks 510~570. The first block 510 includes six pressure sensing modules, wherein the three modules in the upper line have the size of 30×60 cm and each has four square pressure sensors, and the three modules in the lower line have the size of 60×60 cm and each has four long bar pressure sensors. These six modules are connected to a data processing unit, a storage unit, a power managing unit and a communicating unit in the central module of the lower line in common to save the configuration cost. On the other hand, the first block 510 includes a full function board and five sensing boards, and the second block 520 is designed in the same way. Therefore, if the data processing unit supports more ADC channels, the more pressure sensing modules can be used in common and the configuration cost can be further saved. Besides, the most upper module of the third block 530 is configured as a space remaining board (no electronic equipment is set therein), because it is sure that no user will pass by. The fourth and fifth blocks 540, 550 are formed by six pressure sensing modules having the size of 60×60 cm. Each module has four long bar pressure sensors and all sensors are connected to a data processing unit, a storage unit, a power managing unit and a communicating unit in common. The sixth block 560 is configured by three pressure sensing modules with the size of 60×60 cm corresponding to the space of the room. Each module has four long bar pressure sensors and all sensors are connected to a data processing unit, a storage unit, a power managing unit and a communicating unit in common. Notably, the seventh block 570 is formed by three pressure sensing modules, and although the right one thereof also has the size of 60×60 cm, it is formed by four sensing sub-boards and totally contains sixteen square sensors in this module which are connected to a data processing unit in common through four different ADC channels. Accordingly, when the user stands between two sensing sub-boards, the detecting resolution of this module can reach to 15 cm. Therefore, the detecting resolution of the pressure sensing module in the present invention is 15 to 60 cm to meet the different need of the accuracy.

For the first block 510, it is suggested to connect the pressure sensors in each pressure sensing module in parallel which only occupies one ADC channel. Therefore, the density of the pressure sensors can be elastically increased or decreased, but the number of the ADC channels does not need to be increased correspondingly. It means that a single ADC channel can be connected with the pressure sensing modules having the different resolutions and the different densities, and this conception can be applied on the other six blocks.

In the above embodiment, there are seven data processing units and the performing method thereof is suggested to use the event driving, i.e. each data processing unit transmits the signal through the communicating unit, only when it detects the users in its sensing range. This transmission mode can decrease the interference of the wireless communication and increase the scalability of the total configuration.

Figure 4:
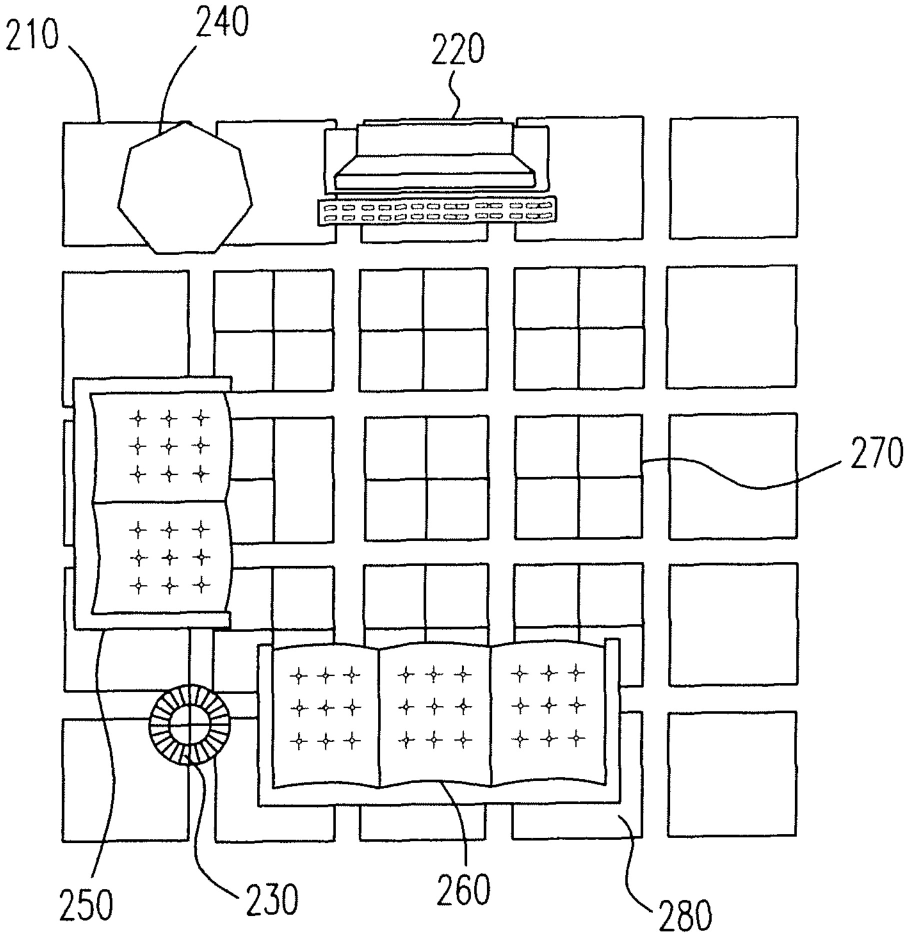
FIG. 4 shows the indoor configuration of the preferred embodiment of the present invention, the pressure sensing based locating and tracking system.

Please refer to FIG. 4, which is the indoor configuration of the preferred embodiment of the present invention, the pressure sensing based locating and tracking system. In this embodiment, the wireless pressure sensing module 210 is set in a given environment in the rectangle shape, and there are totally twenty-five pressure sensing modules on the floor in the living room as showed in FIG. 4. In this environment, the service providing units include the television 220, the reading lamp 230, which provide the multimedia and the illuminating services respectively, and the house facilities therein including the table 240 and the couches 250,260. After analyzing the sensing data within a period, the system can find out that the user A may like to watch TV on the couch 260 and read on the couch 250. Therefore, the system provides the automatic TV service when the user A sits on the couch 260, or provides the illumination service when the user A sits on the couch 250. In this embodiment, the twenty-five pressure sensing modules may have different resolutions respectively, e.g. the central area of this living room has the highest frequency of the activity for the user A, so the pressure sensing modules therein are set by the higher resolution, which is four times of the pressure sensing module 210. Besides, some modules are covered by the house facilities, so are configured as the space remaining boards 280.

In some embodiments, the data processing units in every pressure sensing modules can be pre-set that no pressure is detected at a time or within a time interval, e.g. AM 2:00 or any time without the user in this environment, and the data collected in this time can be set as a clean datum, which can be used by the system to compare and correct the sensing data in other time and to set the standard for the event driving. Besides, if the environment is changed, e.g. the moving of the house facilities or the increase of the household appliances, the clean datum are also used to reset the standard for the event driving. In the condition of the multi-users, the locating and tracking mechanism of the centralized platform uses the collected sensing data to track those users under the uncertain environment factors through the locating and tracking algorithm or filter and the cooperation with the data association mechanism, and updates the states of those users continuously with time.

Moreover, the present invention can also be applied to the detecting and alarming functions of the guarding system. In the specific time, the system detects a user whose features are inexistent in the stored data, the sensing data will be sent to the alarm system to provide a warning or call the police.

The processing logic, the algorithm or the specific data type used in the present invention all are able to be included in the substantive media in the program code type, e.g. the soft disk, the CD, the hard disk or the other storage media readable by any other machine. When the program code is loaded and performed, the machine becomes to a device cooperating with the present invention. The operation method and the processing flow of the present invention are able to be transmitted through the different media such as the cable line, the optical fiber or wireless communication.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A locating and tracking system, comprising:

plural pressure sensing modules, each of which has a size, occupies an ADC channel, and includes:

a plurality of pressure sensing units detecting a pressure source and generating a signal, wherein the plurality of pressure sensing units are in parallel connected to each other and the signal is output through the ADC channel;

a data processing unit connected with the plurality of pressure sensing units, and processing the signal to generate a module information;

a storage unit connected with the data processing unit, and storing the module information or a user information;

a communication unit connected with the data processing unit, transmitting the module information, and receiving an outer information; and a power managing unit managing a power needed by the plurality of pressure sensing units, the data processing unit, the storage unit and the communication unit;

a bottom board configured on a floor, and bearing the plurality of pressure sensing units, the data processing unit, the storage unit, the communication unit and the power managing unit; and a top board covering the plurality of pressure sensing units, the data processing unit, the storage unit, the communication unit and the power managing unit, and transferring the pressure source to the pressure sensing unit, wherein the respective sizes of the plural pressure sensing modules are classified into a first module size and a second module size different from the first module size, a part of the plural pressure sensing modules having the first module size has a first detecting resolution determined based on the first module size, and a part of the plural pressure sensing modules having the second module size has a second detecting resolution determined based on the second module size and different from the first detecting resolution.

2. The locating and tracking system as claimed in claim 1, wherein the module information includes a sensing data derived from the signal from the plurality of pressure sensing units and an identification (ID) of each of the plurality of pressure sensing units.

3. The locating and tracking system as claimed in claim 2, wherein the processing unit determines a location of the pressure source by recognizing the sensing data.

4. The locating and tracking system as claimed in claim 2, wherein the sensing data includes a weight data of the pressure source, and the user information includes a user weight and a user ID.

5. The locating and tracking system as claimed in claim 4, wherein the processing unit recognizes the user ID by comparing the user weight with the weight data.

6. The locating and tracking system as claimed in claim 1, further comprising a service providing unit and a remote centralized platform locating and tracking the pressure source according to the module information and driving the service providing unit according to a motion state of the pressure source.

7. The locating and tracking system as claimed in claim 1, wherein the respective sizes of the pressure sensing modules are further classified into the first module size, the second module size and a third module size different from either one of the first module size and the second module size, and a part of the pressure sensing modules having the third module size has a third detecting resolution determined based on the third module size and different from either one of the first detecting resolution and the second detecting resolution.

8. A method for locating and tracking, comprising steps of:

providing a first pressure sensing module having a first size and a first ADC channel;

providing a first detecting resolution by the first pressure sensing module to detect a pressure source;

sensing the pressure source to generate a first signal related to the pressure source by the first pressure sensing module;

providing a second pressure sensing module having a second ADC channel and a second size different from the first size; and changing the first detecting resolution to a second detecting resolution different from the first detecting resolution by replacing the first pressure sensing module with the second pressure sensing module.

9. The method as claimed in claim 8, further comprising steps of:

converting the first signal into a digitalized value through the first ADC channel;

comparing the first signal with a module information and a user information to identify an ID and a first location of a user;

storing the first location of the user;

sensing the pressure source to generate a second signal related to the pressure source by the second pressure sensing module;

converting the second signal into a second digitalized value through the second ADC channel;

comparing the second signal with the module information and the user information to identify the ID and a second location of the user; and storing the second location of the user.

10. The method as claimed in claim 9, further comprising a plurality of the second pressure sensing modules, each of which has the second size, and a sum of the respective second sizes of the second pressure sensing modules equals the first size.

11. The method as claimed in claim 9, wherein the first and the second signals include a weight data of the pressure source, the module information includes an ID of a sensor, and the user information includes a weight data and the ID of the user.

12. A locating and tracking system, comprising:

a first pressure sensing module having a first size and a first detecting resolution, occupying a first ADC channel and including a first pressure sensing unit, wherein the first pressure sensing unit detects a pressure source and generates a first signal, and the first signal is output through the first ADC channel; and a second pressure sensing module having a second size different from the first size and a second detecting resolution different from the first detecting resolution, occupying a second ADC channel and including a second pressure sensing unit, wherein the second pressure sensing unit detects the pressure source and generates a second signal, and the second signal is output through the second ADC channel.

13. The locating and tracking system as claimed in claim 12, further comprising:

a data processing unit connected to the first pressure sensing unit and the second pressure sensing unit, and processing the first and second signals to generate a module information;

a storage unit connected with the data processing unit, and storing the module information and a user information;

a communication unit connected to the data processing unit, transmitting the module information, and receiving an outer information;

a power managing unit managing a power needed by the first pressure sensing unit, the second pressure sensing unit, the data processing unit, the storage unit and the communication unit;

a bottom board configured on a floor, and bearing the first pressure sensing unit, the second pressure sensing unit, the data processing unit, the storage unit, the communication unit and the power managing unit; and a top board covering the first pressure sensing unit, the second pressure sensing unit, the data processing unit, the storage unit, the communication unit and the power managing unit, and transferring the pressure source to the pressure sensing unit.

14. The locating and tracking system as claimed in claim 13, wherein the power is one selected from a group consisting of a battery, a DC power and an AC power.

15. The locating and tracking system as claimed in claim 12, wherein the first pressure sensing unit converts the first signal into a first digitalized value through the first ADC channel, and the second pressure sensing unit converts the second signal into a second digitalized value through the second ADC channel.

16. The locating and tracking system as claimed in claim 12 further comprising a third pressure sensing module, wherein the third pressure sensing module has a third size different from either one of the first size and the second size, occupies a third ADC channel and includes a third pressure sensing unit, and the third pressure sensing unit detects the pressure source and generates a third signal.

17. The locating and tracking system as claimed in claim 16, wherein the third pressure sensing module having the third size has a third detecting resolution different from either one of the first detecting resolution and the second detecting resolution.

18. The locating and tracking system as claimed in claim 12, wherein the first size is 60×60 cm and the second size is 30×30 cm.

19. The locating and tracking system as claimed in claim 12, wherein the pressure source is one of a human and an object moving on the pressure sensing module.

20. The locating and tracking system as claimed in claim 12, wherein the communication unit is one of a wireless communication device and a wire communication device.

21. A method for locating and tracking, comprising steps of:

providing a first pressure sensing module having a first size and an ADC channel;

providing a first detecting resolution by the first pressure sensing module to detect a pressure source, wherein the first detecting resolution varies with the first size of the first pressure sensing module;

sensing the pressure source to generate a signal related to the pressure source by the first pressure sensing module;

providing a second pressure sensing module having a second ADC channel and a second size different from the first size; and changing the first detecting resolution to a second detecting resolution different from the first detecting resolution by replacing the first pressure sensing module with the second pressure sensing module.

* * * * *